United States Patent Office 2,974,046
Patented Mar. 7, 1961

2,974,046
METHOD OF INHIBITING THE GROWTH OF MICROBACTERIAL ORGANISMS IN A CULTURED MILK PRODUCT AND THE RESULTING PRODUCT

George A. Perry, Elmhurst, N.Y., and Robert L. Lawrence, Middlesex, N.J., assignors to Corn Products Company, New York, N.Y., a corporation of Delaware No Drawing. Filed May 19, 1959, Ser. No. 814,162

10 Claims. (Cl. 99—162)

This invention relates to a method of selectively controlling the growth of micro-biological organisms in cultured milk products intended for food use and to cultured milk products made thereby.

It is well known that cultured milk products, such as creamed cottage cheese, cultured buttermilk, yogurt and the like, and mixtures thereof with added fruits or vegetables, contain at completion of pasteurization a substantial micro-biological population, that is, such products are not completely sterile when sold. Consequently, they are subject to alterations due to growths of the different kinds of contained organisms.

It is also well known that the micro-biological population of these products are of two types. One type comprises the bacteria which cause spoilage and include such species as *Alcaligenee viscosus, Aerobacter aerogenes, Pseudomonas viscosa* and *Pseudomonas fragi*. These bacteria are the cause of slime formation, slimy curd defect, ropy-milk effects, off-flavors and spoilage. They are here generally described as "spoilage bacteria."

The other type of bacteria are those which perform useful functions as they multiply. One class of such bacteria is the genus *Leuconostoc*, of which the principal species are *mesenteroides, dextranicum* and *citrovorum*. These bacteria, as they multiply, utilize citric acid to form diacetyl, together with homologous diketones and related and associated compounds, all of which enhance the flavor and nutritious qualities. Another group of bacteria is the genus *Lactobacillus* of which the principal species are *L. helveticus, L. bulgaricus* and *L. casei*. These bacteria, as they multiply, serve as natural coagulants for the cultured milk product. All of the aforementioned bacteria of the second type are herein referred to as "useful bacteria."

The present invention is based upon the discovery that sorbic acid, or any of its edible salts such as calcium, potassium and sodium sorbate, which on acidification yield sorbic acid, will, when added to a cultured milk product in small and apparently critical amounts depending upon the pH of the cultured milk product, promote to a surprising and unexpected degree the growth of useful bacteria, and almost totally inhibit the growth of spoilage bacteria, for periods of time exceeding the maximum periods during which it is likely that such a product would be expected to have a shelf life, or to be kept in the home.

In a series of tests using 31.1 pound samples of creamed cottage cheese taken from regular production in a dairy plant, the control samples were free of sorbic acid and the test samples contained 0.05% sorbic acid, based on the total weight of the creamed cottage cheese, which had been uniformly distributed through the cottage cheese by prior dissolution thereof in the cream dressing. At the beginning of these tests, samples of cottage cheese from both the control and the test masses were made the subject of bacterial plate counts and microscopic examination, and the number of bacteria present was calculated on a per gram basis. Since useful bacteria and spoilage bacteria could not, at the beginning of the test, be visually distinguished, the count of 5,000 per gram established at the beginning of the test was assumed arbitrarily to be one-half of each type. The samples were then stored at 50° F. for varying periods of time, as indicated in the table which follows. At the end of each period of time a representative interior portion of a control and of a test sample were subjected to bacterial plate counts and microscopic examination of the bacteria contained therein. Each time that a count was made, both on the starting day and on each subsequent day, a gas test was run on an extracted sample, this being the usual gas test employing formate ricinoleate broth.

In the table which follows, the bacterial count is given on a per gram basis for each of the control and test samples for the periods of time set forth in the table, as well as the results of the corresponding gas test.

*Bacterial count per gram of interior portions of samples of creamed cottage cheese held at 50° F. for varying periods of time*

Control Sample (no sorbic acid)

| Days | Useful Bacteria | Spoilage Bacteria | Gas Test[a] | pH |
|---|---|---|---|---|
| 0 | [b] 2,500 | [b] 2,500 | neg. | 4.9 |
| 6 | (c) | 500,000 | pos. | 4.9 |
| 10 | (c) | [e] 2,000,000 | pos. | 4.8 |
| 14 | (c) | [f] 1,200,000 | pos. | 4.4 |
| 23 | (c) | [f] 600,000 | pos. | 4.4 |

Test Sample (0.05% sorbic acid)

| Days | Useful Bacteria | Spoilage Bacteria | Gas Test[a] | pH |
|---|---|---|---|---|
| 0 | [b] 2,500 | [b] 2,500 | neg. | 4.9 |
| 6 | 15,000 | (d) | neg. | 4.9 |
| 10 | 105,000 | (d) | neg. | 4.9 |
| 14 | 240,000 | (d) | neg. | 4.8 |
| 23 | 4,000,000 | (d) | neg. | 4.8 |

[a] Gas test—Formate ricinoleate broth.
[b] At day 0 the bacterial count was 5,000 per gram for each of the control and the test samples. One-half of these were assumed to be useful bacteria, and the other half spoilage bacteria.
[c] No detectable increase.
[d] No detectable increase in bacterial, yeast or mold counts.
[e] Inedible due to excessive spoilage bacteria coupled with yeast and mold growth.
[f] Decrease in spoilage bacteria after 10 days due to competitive action of yeast and mold growth with attendant lowering of pH.

The foregoing demonstrates that sorbic acid has a selective capacity for controlling the growth of useful and spoilage bacteria. It appears to promote the growth of useful bacteria, and to inhibit the growth of spoilage bacteria. In each case, a control mass of creamed cottage cheese, and a mass containing 0.05% of sorbic acid, each of which had been held at 50° F. for the number of days indicated in the above table, was then subjected to organoleptic examination by a panel of judges. In the case of each test sample, the panel did not report any significant increase in spoilage factors and reported favorably on odor and on flavor retention. On the other hand, each of the control samples, after ten days of incubation, were found to be objectionable in odor, taste and appearance, and to be inedible.

According to the present invention, selective control of bacterial growth in cultured milk products, for example, in creamed cottage cheese, is effected by adding to the milk product from approximately 0.03% to approximately 0.15%, by weight on the total milk product, or sorbic acid or its equivalent in the form of the calcium, potassium or sodium salts of sorbic acid.

The lower limit in the stated range is determined by loss of effectiveness. For example, when the sorbic acid is as little as about 0.01% there seems to be no discrimination between useful bacteria and spoilage bacteria. The upper limit of the range is determined by the appearance of an organoleptically noticeable sour taste characteristic of sorbic acid. This sour taste begins to appear in cultured milk products having a pH close to neutrality when sorbic acid is above about 0.15%. For example, when the curd in creamed cottage cheese is made by enzymatic treatment, such as rennet, the curd and hence the resulting creamed cottage cheese has a pH of about 6.4, and the permissible upper limit of sorbic acid is about 0.15%. However, in the case of cultured milk products having a lower pH, such as a pH of from about 4.6 to about 5.1, which is characteristic of creamed cottage cheese made with washed cultured curd, the sour taste begins to appear when sorbic acid exceeds about 0.08%. It appears, therefore, that the permissible upper limit of sorbic acid declines when the cultured milk product is slightly acid, and becomes greater as the cultured milk product approaches neutrality.

In adding sorbic acid to a mixed cultured milk product such as creamed cottage cheese, it is preferred that the sorbic acid be mixed first with the cream dressing where it is relatively highly soluble in the fats present and wherein its inhibiting effect on spoilage bacteria improves the storage characteristics of the cream dressing prior to being mixed with the curd. The thus-treated cream dressing is then mixed with curd in the usual way. Ordinarily, creamed cottage cheese consists of about four parts curd and one part cream dressing. The amount of sorbic acid added to the cream dressing is calculated upon the total weight thereof desired in the mixed creamed cottage cheese.

The preferred range for sorbic acid is about 0.05% to about 0.07% based on the total weight of the cultured milk product thus treated. Where calcium, potassium or sodium sorbate is used, an amount is chosen which will release the desired amount of sorbic acid in the final product.

EXAMPLE 1

To twenty-five pounds of washed cultured cottage cheese curd having a pH of about 4.5, there were added six pounds of cream dressing containing 0.31 pounds of salt to which 0.016 pound of sorbic acid had been added following pasteurization and homogenization while the cream dressing was at a temperature of about 80° F. The cream dressing was cooled to 40° F. and the curd and dressing were thoroughly mixed together. In this mixture sorbic acid constituted approximately .05% by weight.

Samples of this creamed cottage cheese, preserved at 50° F. for three weeks, showed no significant spoilage characteristics, had acceptable odor and flavor, and showed a negative gas test.

EXAMPLE 2

A batch of cultured cottage cheese was made up exactly as in Example 1, except that the .016 pound of sorbic acid was replaced by 0.02 of calcium sorbate. The effective quantity of sorbic acid in the final product remained the same as in Example 1, namely, .05% by weight, and the results were the same.

EXAMPLE 3

A batch of cultured cottage cheese was made up exactly as in Example 1, except that the .016 pound of sorbic acid was replaced by 0.021 of potassium sorbate. The effective quantity of sorbic acid in the final product remained the same as in Example 1, namely, .05% by weight, and the results were the same.

In the case of a cultured milk product which is intended to be edible without dilution, the upper limit for sorbic acid or its equivalent is determined by the taste characteristic imparted by the sorbic acid and is of the order hereinabove mentioned. However, from the point of view of mere preservation of a cultured milk product, larger amounts of sorbic acid or its equivalent may be employed, particularly when the cultured milk product is admixed with other edible substances in its ultimately edible form. For example, a substantial amount of curd is supplied to bakeries without the addition of a cream dressing for use in various baked products. For the preservation of the curd intended for such uses one may employ sorbic acid or its equivalent in an amount such that the sorbic acid constitutes up to about 0.2% of the curd. While the taste characteristic of sorbic acid is apparent in the curd when the sorbic acid is at a concentration as high as 0.2%, the employment of the curd in baked products such as cheese cake or the like results in such reduction in the sorbic acid content of the food product ultimately eaten that the food product is acceptable from the standpoint of its taste characteristics. For application of sorbic acid to the curd a solution may be applied to the curd in any suitable way such as by spray application. To assist in the dissolving of sorbic acid, an edible solvent medium may be utilized such as glycerin and propylene glycol. For example, sorbic acid may be added to the curd in the form of a 5% solution in a solvent containing water, glycerin and propylene glycol in about equal proportions, the solvent mixture being heated to about 130° F. in order to facilitate the solution of the sorbic acid. In the case of the calcium, potassium or sodium salts of sorbic acid these salts may be added in the form of the water solution. If desired, curd preserved in the manner mentioned may be employed in the manufacture of creamed cottage cheese by the addition of a cream dressing thereto with resultant lowering of sorbic content so as to be within the limits hereinabove mentioned for a creamed cottage cheese product.

We claim:

1. The method of selectively controlling the growth of microbacterial organisms in a cultured milk product which comprises adding to said cultured milk product a substance selected from the group consisting of sorbic acid and the calcium, potassium and sodium salts of sorbic acid in an amount sufficient to produce about 0.03% to about 0.15% by weight of sorbic acid therein.

2. The method of selectively controling the growth of microbacterial organisms in a cultured milk product having a pH lower than about 5.1 which comprises adding to said cultured milk product a substance selected from the group consisting of sorbic acid and the calcium, potassium and sodium salts of sorbic acid, in an amount sufficient to produce about 0.03% to about 0.08% by weight of sorbic acid therein.

3. In a method of making creamed cottage cheese wherein a cream dressing is mixed with washed curd, the improvement which comprises dissolving in the cream dressing before mixing thereof with the curd an amount of a substance selected from the group consisting of sorbic acid and the calcium, potassium and sodium salts thereof sufficient to produce about 0.03% to about 0.15% by weight of sorbic acid in the mixture of dressing and curd.

4. In a method of making creamed cottage cheese wherein a cream dressing is mixed with washed cultured curd having a pH of about 4.5, the improvement which comprises dissolving in the cream dressing before mixing thereof with the curd an amount of a substance selected from the group consisting of sorbic acid and the calcium, potassium and sodium salts thereof sufficient to produce about 0.03% to about 0.08% by weight of sorbic acid in the mixture of dressing and curd.

5. A cultured milk product containing from about 0.03% to about 0.15% by weight of sorbic acid.

6. A cultured milk product having a pH between about 4.5 and about 5.1 containing from about 0.03% to about 0.08% by weight of sorbic acid.

7. Creamed cottage cheese having a pH from about 4.5 to about 6.4 and containing from about 0.03% to about 0.15% by weight of sorbic acid.

8. Creamed cottage cheese having a pH from about 4.5 to about 5.1 and containing from about 0.03% to about 0.08% by weight of sorbic acid.

9. The method of selectively controlling the growth of microbacterial organisms in a cultured milk product which comprises adding to said cultured milk product a substance selected from the group consisting of sorbic acid and the calcium, potassium and sodium salts of sorbic acid in an amount sufficient to produce therein an amount of sorbic acid ranging from an effective amount up to about 0.2% by weight.

10. A cultured milk product containing sorbic acid in an amount ranging from an amount effective to control the growth of microbacterial organisms up to about 0.2% by weight.

References Cited in the file of this patent
UNITED STATES PATENTS

| | | |
|---|---|---|
| 2,379,294 | Gooding | June 26, 1945 |
| 2,865,764 | Gorsica et al. | Dec. 23, 1958 |